F. P. SCHERSCHEL.
MARKING DEVICE FOR CORN PLANTERS.
APPLICATION FILED AUG. 16, 1910.
1,013,071.
Patented Dec. 26, 1911.
3 SHEETS—SHEET 1.
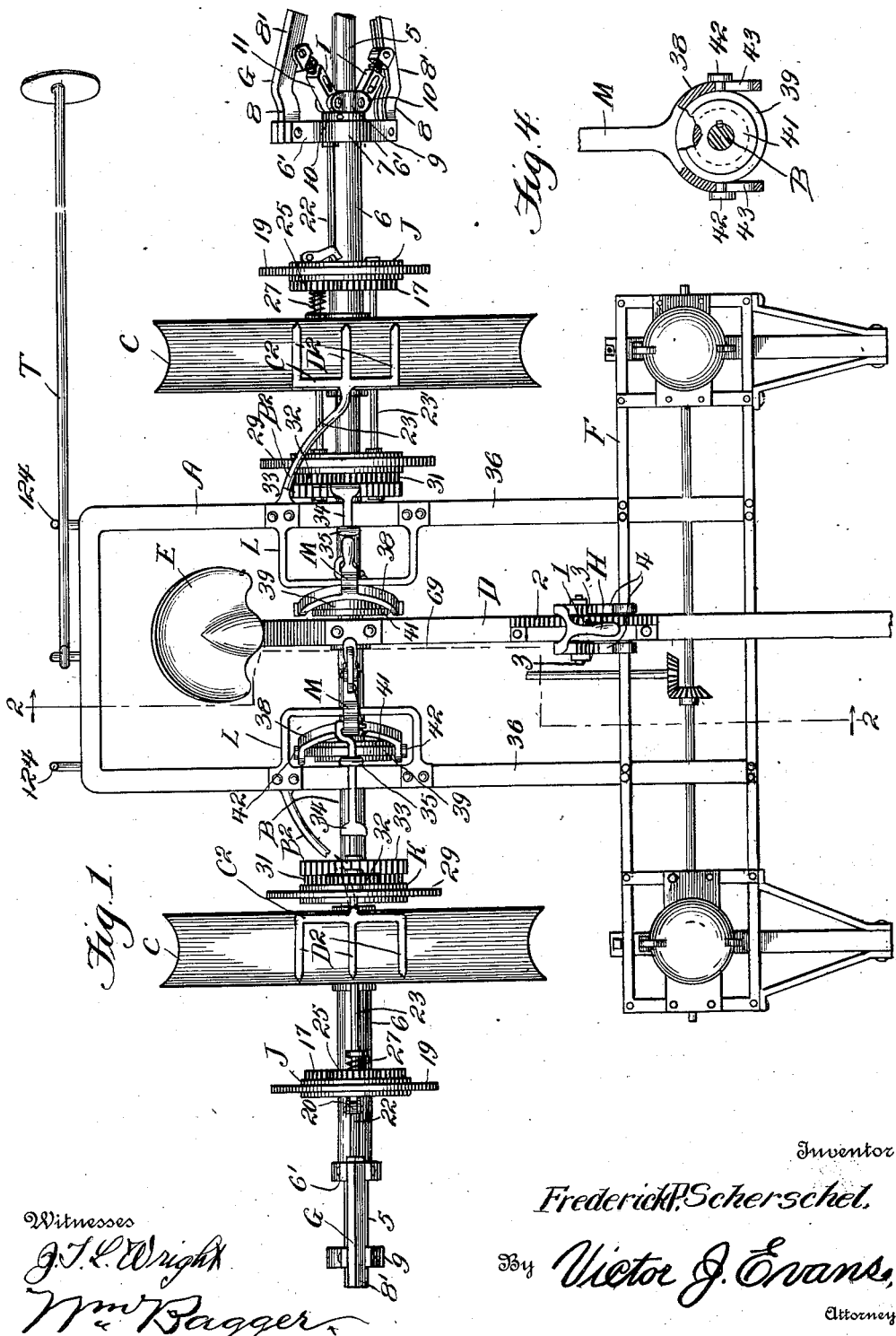

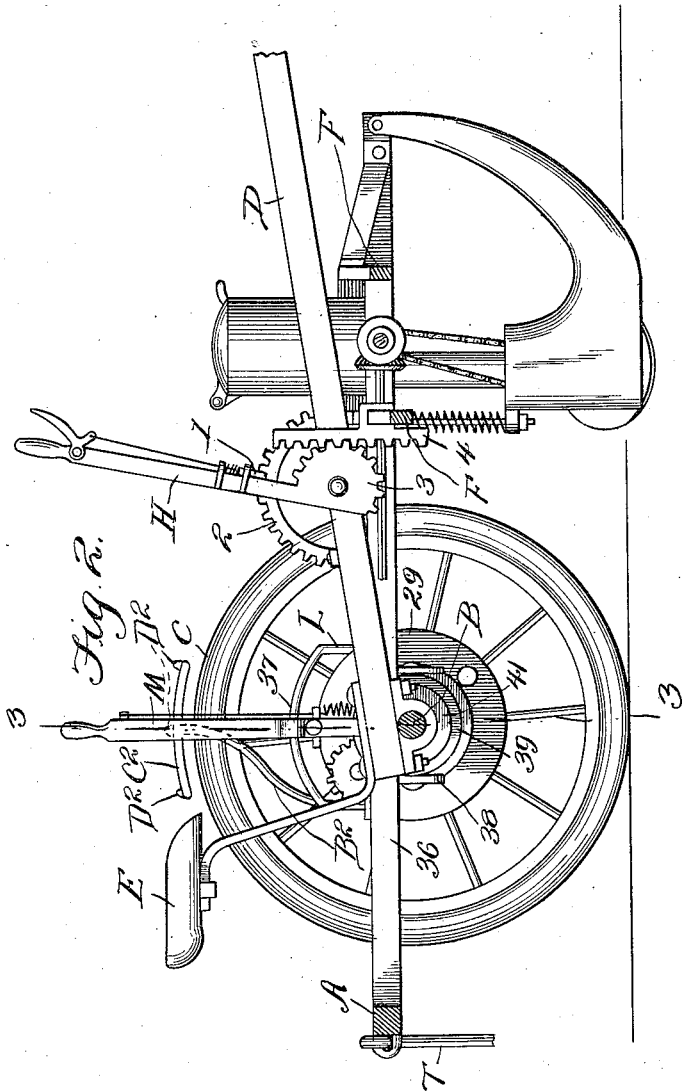

F. P. SCHERSCHEL.
MARKING DEVICE FOR CORN PLANTERS.
APPLICATION FILED AUG. 16, 1910.
1,013,071.
Patented Dec. 26, 1911.
3 SHEETS—SHEET 3.
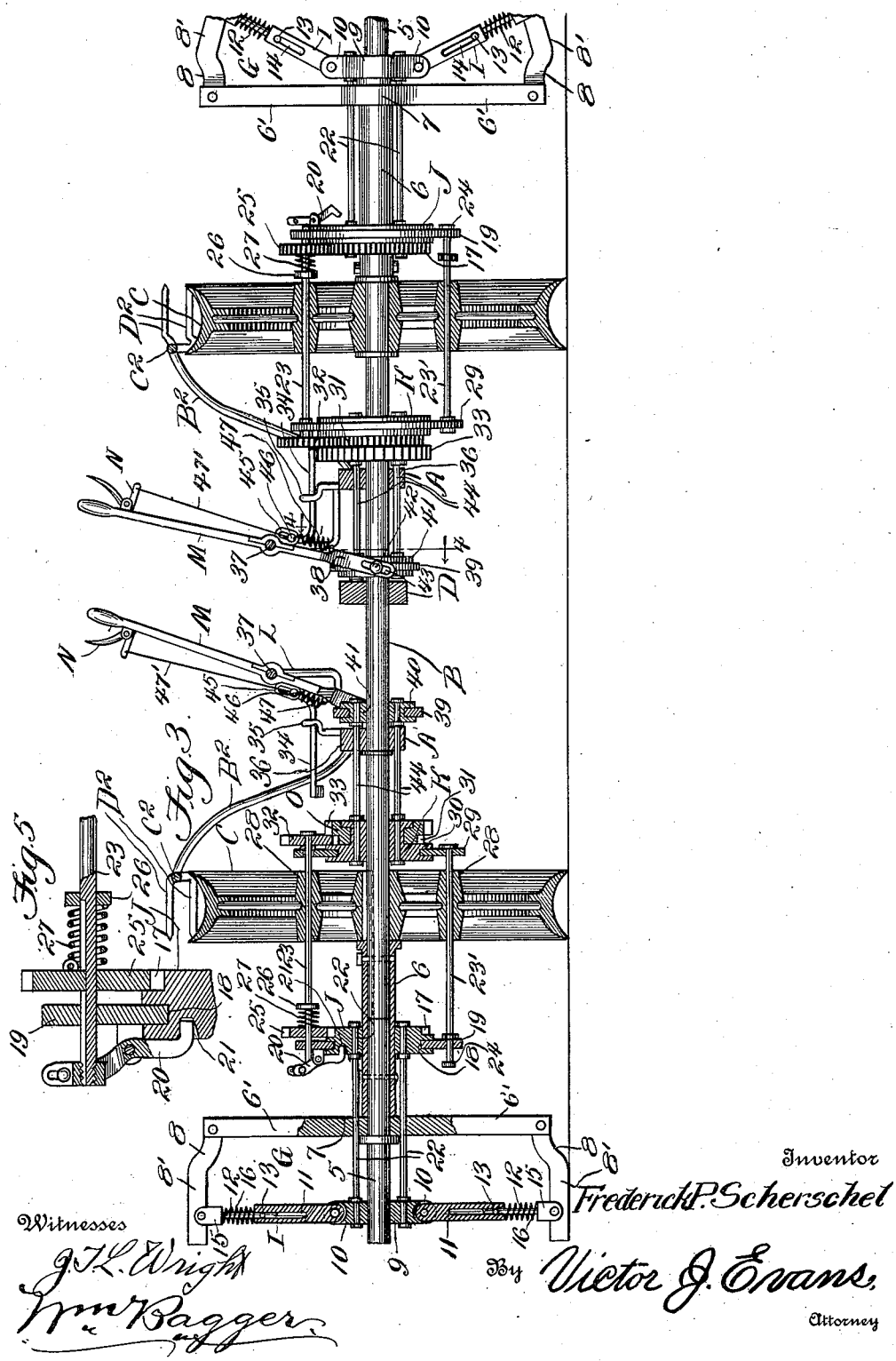

UNITED STATES PATENT OFFICE.

FREDERICK P. SCHERSCHEL, OF BEDFORD, INDIANA.

MARKING DEVICE FOR CORN-PLANTERS.

1,013,071.  Specification of Letters Patent.  Patented Dec. 26, 1911.

Application filed August 16, 1910.  Serial No. 577,421.

*To all whom it may concern:*

Be it known that I, FREDERICK P. SCHERSCHEL, a citizen of the United States of America, residing at Bedford, in the county of Lawrence and State of Indiana, have invented new and useful Improvements in Marking Devices for Corn - Planters, of which the following is a specification.

This invention relates to marking devices for corn planters, and it has for its object to produce a simple and durable machine which may be easily operated for marking the ground properly and efficiently and in a thoroughly satisfactory manner.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view partly in section of a corn planter equipped with a marking device constructed in accordance with the invention. Fig. 2 is a longitudinal vertical sectional view taken on the line 2—2 in Fig. 1. Fig. 3 is a transverse vertical sectional elevation taken on the line 3—3 in Fig. 2. Fig. 4 is a sectional detail view taken on the line 4—4 in Fig. 3. Fig. 5 is a detail section view of a portion of the mechanism for adjusting the markers.

Corresponding parts in the several figures are denoted by like characters of reference.

The main frame A of the improved machine is supported upon the axle B having the ground wheels C—C one of which may be loose upon the axle for convenience in turning. The tongue D, which is pivotally connected with the axle, carries the driver's seat E. The seeder frame F is suitably mounted transversely upon the front end of the main frame, and said seeder frame may be lowered for operation or raised for transportation by means of a hand lever H which is fulcrumed upon the tongue, said hand lever being provided with a spring-actuated stop member 1 of ordinary well known construction adapted to engage a quadrant 2. The hand lever H is equipped with a toothed segment 3 meshing with a rack bar 4 which is connected with the seeder frame for the purpose of effecting the desired adjustment. The axle B carries at the ends thereof the marking devices G, G, said marking devices being mounted upon stub axles 5 which are detachably connected with the main axle of which they form a part by means of sleeves 6, thus enabling said marking devices to be conveniently detached when the machine is to be utilized as a drill. Each of these marking devices includes a pair of diametrically opposed radial arms 6' extending from a hub 7 and having the markers 8 pivotally attached at their outer ends. Said markers or marker shoes may be of V-shape or triangular in cross section, and they may be conveniently manufactured from pieces of angle iron by properly bending and manipulating the same, said marker shoes being formed with outwardly offset earth-engaging portions 8'. The hub 7 it will be understood is mounted for rotation with reference to the axle, but suitable means are to be provided to restrain it from sliding movement. Each marking device further includes a hub 9 which is slidable and revoluble adjacent to the outer face of the hub 7, said hub 9 being provided with radial arms 10 that are connected with the marker shoes by means of links I. Each of these links includes a socket member 11 pivotally connected with one of the arms 10 and an extension rod 12 slidably engaging the socket member where it is secured by a transverse pin 13 engaging a slot 14, said extension rod being provided with a terminal yoke 15 pivotally connected with one of the marker shoes, and said extension member being normally forced in an outward direction by means of a spring 16 coiled upon the projecting portion of the rod 12 between the yoke 15 and the socket member 11.

It will be readily seen that by moving the hub 9 in an inward direction, that is to say, toward the middle of the machine, the marker shoes will be tilted or inclined to a non-engaging position with reference to the ground, as shown at the right hand side of Fig. 3. When the hub 9 is slid or moved in an outward direction, the marker shoes will assume the ground engaging position shown at the left side of Fig. 3, and when in this position it is obvious that the marker shoes are capable of yielding against the tension of the spring 12 if stones, stumps or other obstructions should be encountered.

Between each of the marking devices and the adjacent ground wheel is a collar J mounted for rotation, said collar having a toothed portion constituting a spur wheel 17 and an annular groove 18, the latter affording a seat for a revoluble ring 19 with which is pivotally connected a pawl or latch member 20 which is adapted to engage recesses 21 formed in the outer face of the collar J. Extending through the collar J at diametrically opposite sides are rods 22 which project through the hubs 7 and 9 of the marking device. Additional rods 23, 23' extend through the ring 19 at diametrically opposite sides of the axle, one of said rods being terminally connected with the latch member 20, and the other being provided with a terminal stop member, such as a head 24. The rod 23, which is connected with the latch member 20, is also provided with a pinion 25 which is keyed upon said rod for slidable movement and for rotation therewith, said pinion being in mesh with the spur wheel 17 formed upon the collar J. The rod 23 is also provided with a stop member 26 between which and the pinion a spring 27 is disposed to bear against the pinion for the purpose of keeping it in mesh with the spur wheel. The rods 23, 23' extend through guide sleeves 28 upon the ground wheels and are also extended through a ring 29 revolubly fitted in an annular groove 30 formed in a collar K which is slidably and revolubly disposed upon the axle between the frame and the ground wheel. The collar K carries a revoluble annulus O upon which is formed a spur wheel 31 meshing with a pinion 32 carried by the rod 23 upon which said pinion is fixed securely. The annulus O is also provided with a circumferential series of teeth 33 adapted to be engaged by one end of a lever 34 which is fulcrumed upon a pin or supporting member 35 rising from the frame A, said lever being actuated by means to be presently described.

Connected with and rising from each of the side members 36 of the frame A is a bracket L including an arcuate bar or guide member 37 which is concentric with the axis of the axle and which constitutes a fulcrum upon which a hand lever M is slidably mounted. The lower end of the hand lever M is bifurcated, as shown at 38, see Fig. 4, to straddle a ring 39 which is revolubly mounted in an annular groove 40 in a collar or hub 41 which is slidably mounted upon the axle between the side bar 36 of the main frame and the tongue D. The lever fork 38 is pivotally connected with the ring 39 by means of headed pins 42 at diametrically opposite sides of said ring, the lever being provided with slots, as indicated at 43, for slidable connection with the pins 42. The hub or collar 41 is connected with the collar K by means of rods 44 which may be guided through apertures in the side bars of the frame. The hand lever M is provided with a slot 45 wherein is guided a head 46 formed at the inner end of the lever 34; said lever being actuated by the spring 47 connected with the hand lever M whereby the outer end of the lever 34 will be normally held in a disengaged position with reference to the teeth or projections 33 of the annulus O. A bell crank N mounted upon the lever M has one arm connected by a rod or wire 47' with the head 46 of the lever 34, enabling the latter to be readily tilted to engaging position with reference to the teeth 33.

It will be understood that the equipment for actuating or adjusting the marking devices will be used at both sides of the planter, the construction and arrangement being duplicated.

The frame of the machine is equipped with brackets B² each having a terminal plate C² which is supported adjacent to a ground wheel and curved concentrically therewith, said plate having a plurality of fingers D² extending above the wheel rim and located in parallel relation to the axis about which the wheel revolves. These fingers are preferably disposed in alinement at the two sides of the machine, and they serve as sights whereby the correct position of the marking devices may be determined and any deflection therefrom ascertained at the starting point of each row.

By tilting the lever M upon the fulcrum bar 37 in the plane of the axis of the axle in one direction, the hub or collar 41 will be moved toward the tongue of the machine, causing the rods 44 to pull the collar K carrying the ring 29 which in turn will pull upon the rods 23, 23', the former being actuated to disengage the latch member 20 from the collar J, after which the rods 23, 23' will pull said collar J, which through the medium of the rods 22 will pull the hub 9 in an inward direction, thus tilting the marker shoes to the inoperative position shown at the right of Fig. 3. When the parts are in the relative position there shown, by rocking the hand lever M upon the arcuate fulcrum bar 37 in a plane approximately at right angles to the axle of the machine and by simultaneously actuating the bell crank N, the lever 34 may be alternately placed in engagement with and disengaged from the teeth 33 of the annulus O, thus causing said annulus to be partially rotated or oscillated about the axle, together with the collar 41. The spur wheel 31 which is formed upon and associated with the annulus O meshing with the pinion 32 will rotate the latter, together with the rod or shaft 23 and the pinion 25 which is in mesh with the toothed portion 17 of the collar J which is thus rotated, carrying with it the hubs 7 and 9 which are connected with said collar J by the rods 22. By thus rotating the marking device about the axis of the axle, the said marking device may be readily adjusted to proper position for operation after turning the machine at the end of a row or at any other time. When the desired position has been attained, the hand lever M is tilted upon its fulcrum 37 in the plane of the axis of the axle in the opposite direction to that in which it was previously tilted, thus restoring the parts to the relative position shown at the left of Fig. 3. The lever 34 is now drawn away and disengaged from the portion of the annulus O having the teeth 33, and the latch member 20 is restored to locking engagement with the collar J. When under these conditions the machine is moved upon the ground wheels, the rods 23, 23' and the parts connected therewith will move with the ground wheels, including the marking devices. In case of one ground wheel standing still or rotating faster than the other, as in turning the machine, the rings 19 and 29 connected with the collars J, K and engaged by the rods 23, 23' extending through such ground wheel will rotate upon their respective collars, as will be readily understood.

A land marker or gage T of well known construction may be suitably connected with the frame of the machine, said land marker being adapted to be moved from one side of the machine to the other where it may be supported upon hooks 124, as seen in Fig. 1.

From the foregoing description, taken in connection with the drawings hereto annexed, the operation and advantages of my improved corn planter will be readily understood. The several parts of the device combine to form an organized machine which is simple in construction, easy in operation and thoroughly efficient for the purposes for which it is provided.

Having thus described the invention, what is claimed as new, is:—

1. In a corn planter having a frame, an axle and supporting wheels, a marking device including a hub rotatable upon the axle and having radial arms, a hub slidable and rotatable upon the axle and having radial arms, marking shoes pivotally connected with the arms of the first hub, links connecting the shoes with the arms of the second hub, said links comprising socket members, extension rods guided in said socket members and springs whereby the extension rods are projected, and means for bodily moving the slidable hub in the direction of the first mentioned hub, said means including rods connected with the slidable hub and extending through the first mentioned hub.

2. In a corn planter, an axle, a ground wheel upon said axle, sleeves carried by the ground wheel in parallel relation to and at opposite sides of the axle, a marking device including hubs revoluble upon the axle, and one of said hubs being slidable thereon, arms extending radially from the non-slidable hub, marker shoes pivoted upon said arms, arms extending radially from the slidable hub, and links connecting said arms with the pivoted marker shoes, said links including telescoping members, springs to force said members apart, and means to limit such movement; a collar revoluble and slidable upon the axle, rods connecting said collar with the slidable hub through the non-slidable hub, an annular series of spur teeth upon the collar, an annulus revoluble upon the collar, a collar slidable and revoluble upon the axle adjacent to the side of the ground wheel opposite to the first collar, an annulus and a ring revoluble upon said second collar, said annulus being provided with an annular series of spur teeth and with a circumferential series of rack teeth, two shafts supported for rotation in the ring upon the second collar and in the annulus upon the first collar, said shafts extending through the sleeves of the ground wheel, and one of said shafts being provided with a stop member and the second shaft being provided with a catch member adapted for engagement with the first collar, both of said shafts being slidable in the annulus upon the first collar, a pinion upon the second shaft meshing with the spur teeth upon the annulus carried by the second collar, a spring pressed pinion upon said second shaft with which it is slidably connected for rotation therewith, said pinion being in mesh with the spur teeth of the first collar, and means for moving the second collar longitudinally of the shaft and for rotating the spur tooth and rack tooth carrying annulus about said collar.

3. In a corn planter, an axle, a ground wheel upon said axle, sleeves carried by the ground wheel in parallel relation to and at opposite sides of the axle, a marking device including hubs revoluble upon the axle, and one of said hubs being slidable thereon, arms extending radially from the non-slidable hub, marker shoes pivoted upon said arms, arms extending radially from the slidable hub, and links connecting said arms with the pivoted marker shoes, said links including telescoping members, springs to force said members apart, and means to limit such movement; a collar revoluble and slidable upon the axle, rods connecting said collar with the slidable hub through the non-slidable hub, an annular series of spur teeth upon the collar, an annulus revoluble upon the collar, a collar slidable and revoluble upon the axle adjacent to the side of the ground wheel opposite to the first collar, an annulus and a ring revoluble upon said second collar, said annulus being provided with an annular series of spur teeth and with a circumferential series of rack teeth, two shafts supported for rotation in the ring upon the second collar and in the annulus upon the first collar, said shafts extending through the sleeves of the ground wheel, and one of said shafts being provided with a stop member and the second shaft being provided with a catch member adapted for engagement with the first collar, both of said shafts being slidable in the annulus upon the first collar, a pinion upon the second shaft meshing with the spur teeth upon the annulus carried by the second collar, a spring pressed pinion upon said second shaft with which it is slidably connected for rotation therewith, said pinion being in mesh with the spur teeth of the first collar, and means for moving the second collar longitudinally of the shaft and for rotating the spur tooth and rack tooth carrying annulus about said collar, said means including a collar slidable upon the axle, rods connecting said collar with the second above mentioned collar, a revoluble ring carried by the third or last mentioned collar, a suitably supported lever having a bifurcated terminal pivoted upon said revoluble ring, and a second suitably supported spring actuated lever operatively connected with and adapted to be actuated by the first lever, said second lever being adapted for engagement with the rack teeth of the second above mentioned collar to effect partial rotation of said collar about the axle.

4. In a corn planter, a frame, an axle having ground wheels, adjustable marking devices supported by the axle, brackets supported by the frame, and sight fingers connected with said brackets, said fingers being disposed adjacent to the rims of the ground wheels.

5. In a corn planter, a frame, an axle having ground wheels, adjustable marking devices supported by the axle, brackets mounted upon the frame and having curved terminal plates concentric with the axis of the axle, and sight fingers extending from the curved plates adjacent to the rims of the ground wheels.

In testimony whereof I affix my signature in presence of two witnesses.

FREDERICK P. SCHERSCHEL.

Witnesses:
WM. H. MARTIN,
HENRY P. PEARSON.

---

Copies of this patent may be obtained for five cents each, by addressing the "Commissioner of Patents, Washington, D. C."